United States Patent
Huebner et al.

(10) Patent No.: US 10,936,657 B2
(45) Date of Patent: Mar. 2, 2021

(54) AFFINITY DETERMINATION USING GRAPHS

(71) Applicant: NETIQ CORPORATION, Houston, TX (US)

(72) Inventors: Roger Huebner, Sugar Land, TX (US); Polina Alber, Newton, MA (US)

(73) Assignee: Netiq Corporation, Houston, TX (US)

( * ) Notice: Subject to any disclaimer, the term of this patent is extended or adjusted under 35 U.S.C. 154(b) by 250 days.

(21) Appl. No.: 16/119,332

(22) Filed: Aug. 31, 2018

(65) Prior Publication Data

US 2020/0074012 A1 Mar. 5, 2020

(51) Int. Cl.
*G06F 16/00* (2019.01)
*G06F 16/901* (2019.01)

(52) U.S. Cl.
CPC .................. *G06F 16/9024* (2019.01)

(58) Field of Classification Search
CPC ... G06F 16/9024; G06F 3/121; H04L 63/1425
See application file for complete search history.

(56) References Cited

U.S. PATENT DOCUMENTS

| | | | |
|---|---|---|---|
| 8,375,032 B2 | 2/2013 | Birdwell et al. | |
| 8,600,920 B2 | 12/2013 | Flynn et al. | |
| 8,761,512 B1* | 6/2014 | Buddemeier | G06K 9/6282 |
| | | | 382/181 |
| 9,740,368 B1 | 8/2017 | Love et al. | |
| 2010/0169326 A1 | 7/2010 | Ma et al. | |
| 2014/0172371 A1* | 6/2014 | Zhu | G06F 11/0703 |
| | | | 702/185 |
| 2014/0258196 A1* | 9/2014 | Dhurandhar | G06N 20/00 |
| | | | 706/20 |
| 2017/0178011 A1* | 6/2017 | Yeung | G06N 7/005 |
| 2017/0185910 A1 | 6/2017 | Appel et al. | |
| 2017/0337293 A1 | 11/2017 | Farkash et al. | |
| 2018/0024989 A1 | 1/2018 | Bharti et al. | |
| 2018/0123864 A1* | 5/2018 | Tucker | H04L 41/065 |
| 2019/0163835 A1* | 5/2019 | Scheideler | G06N 5/022 |

OTHER PUBLICATIONS

Bogl, et al; Cycle Plot Revisited: Multivariate Outlier Detection Using a Distance-Based Abstraction; Eurographics Conference on Visualization (EuroVis); vol. 36 (2017), No. 3; 2017; 12 pages.

(Continued)

*Primary Examiner* — Alexander Khong (57) ABSTRACT

In some examples, a computer receives event data relating to events of a system, and builds a graph comprising nodes representing respective values of attributes of the events, and edges between the nodes, each respective edge of the edges representing co-occurrence of values of attributes represented by nodes connected by the respective edge. The computer computes edge weights of corresponding edges of the edges, and identifies paths in the graph, where each path of the paths comprises two or more nodes and a corresponding edge or edges. The computer determines an affinity among the values of the attributes based on a shortest path determining process that uses the edge weights for distances of the identified paths, and resolves an anomaly in the system based on the determined affinity.

20 Claims, 7 Drawing Sheets

(56) References Cited

OTHER PUBLICATIONS

Petros Damos; BMC Ecology; Using Multivariate Cross Correlations, Granger Causality and Graphical Models to Quantify Spatiotemporal Synchronization and Causality between Pest Populations; Dec. 2016; 36 pages.

Qiu, et al; Clustering based on the In-tree Graph Structure and Affinity Propagation; University of Electronic Science and Technology of China, Chengdu, China; Jan. 29, 2018; 6 pages.

Wikipedia, Dijkstra's algorithm last edited Jul. 10, 2018 (7 pages).

\* cited by examiner

AFFINITY DETERMINATION USING GRAPHS

BACKGROUND

Data records can contain attributes to represent corresponding objects. An object can refer to a physical entity, a virtual entity, an activity, or any other item about which information can be collected. Each variable can have multiple possible values. Performing analysis on a large number of data records that contain multiple variables with multiple values is a multivariate, multi-valued problem that can be complex.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A system can include processing nodes, storage nodes, communication nodes, virtual machines, programs, and/or other resources. Examples of systems include information technology (IT) systems, cloud systems that provide cloud resources and/or cloud services accessible by tenants of the cloud systems, server systems (e.g., web server systems, application server systems, storage server systems, etc.), and so forth.

Events can occur in the system due to activities of users, the resources, or other entities. An "event" can refer to an activity (e.g., an operation, a computation, an output, etc.) that occurred in the system. Some of the events may be due to anomalies of the system. Anomalies can be caused by errors in the execution of programs, defects or faults of programs or machines, malware introduced into the system, and so forth.

In attempting to address anomalies, some techniques or mechanisms attempt to identify affinity between events occurring in the system. Affinity between events refers to a relationship between the events. The identified affinity between events can be used to determine an underlying cause of an anomaly that has occurred in the system.

Events can be represented by event data (in the form of event objects that represent respective events). Each event object can include multiple attributes, and each attribute can have any of various values. An "attribute" can refer to a variable, a parameter, or any information element that can be assigned one of multiple different values. An event object can include information pertaining to attributes acquired by sensors, monitoring agents, and/or other entities in the system. The problem of determining affinity among event objects is in a multi-variate, multi-valued problem space that includes a large number of attributes and values of the attributes (a multi-dimensional space with a large number of dimensions, where the dimensions correspond to the attributes and the values of the attributes).

Traditional techniques of determining binary attribute relationships between pairs of attributes may not accurately identify affinity among events in the large dimensional space.

In accordance with some implementations of the present disclosure, graph-based affinity determination techniques and mechanisms are provided to determine affinity among events that have a large number of attributes and attribute values. Such techniques or mechanisms receive event data relating to events of a system, and build a multi-planar graph including nodes representing respective values of attributes of the events, and edges between the nodes, where each respective edge of the edges represents co-occurrence of values of attributes represented by nodes connected by the respective edge. The techniques or mechanisms further compute edge weights of corresponding edges of the edges based on counts associated with the nodes and counts associated with the edges, and use the edge weights for distances in a shortest path determining process to identify paths in the graph, where each path of the paths comprises two or more nodes and a corresponding edge or edges. Further, the techniques or mechanisms determine an affinity between the values of the attributes based on the identified paths, and resolve an anomaly in the system in response to the determined affinity between the values of the attributes based on a shortest path determining process that uses the edge weights for distances of the identified paths.

Figure 1:
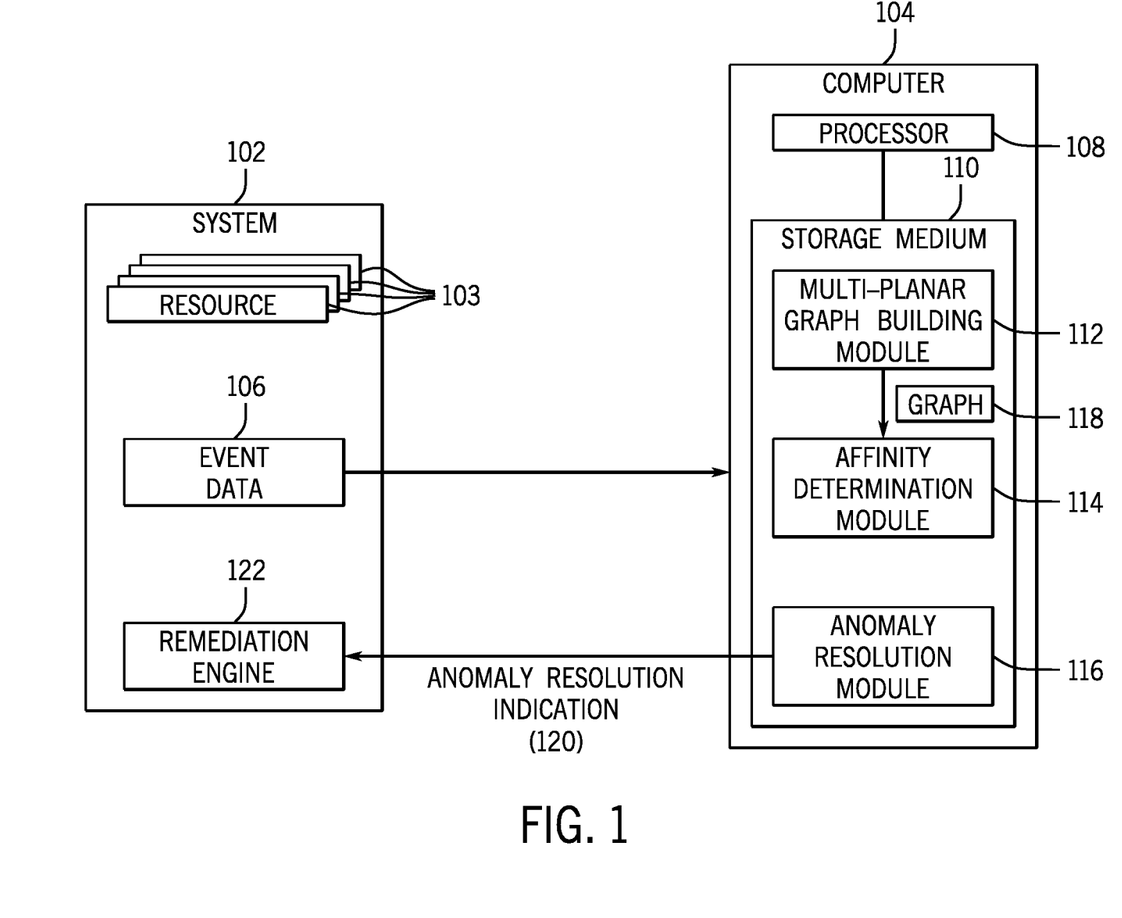
FIG. 1 is a block diagram of an arrangement including a system and a computer for performing graph-based affinity determinations according to some examples.

FIG. 1 is a block diagram of an example arrangement that includes a system 102 and a computer 104. The system 102 can be an IT system, a cloud system, a server system, and so forth. The system 102 includes various resources 103, such as processing resources, storage resources, communication resources, virtual machines, programs, and so forth, which can perform respective tasks.

Event data 106 is collected by various sensors, monitoring agents, or other entities in the system 102. The event data 106 relates to events that occurred in the system 102. For example, events in the system 102 can include events of the resources 103.

The event data 106 is communicated to the computer 104, such as over a network (not shown). The computer 104 can be implemented using a single computing node or multiple computing nodes that can be distributed across different locations.

The computer 104 includes a processor (or multiple processors) 108, and a storage medium 110, which can be implemented with a memory device and/or a storage device (or multiple memory devices and/or storage devices). The storage medium 110 can store various machine-readable instructions, including a multi-planar graph building module 112, an affinity determination module 114, and an anomaly resolution module 116.

The multi-planar graph building module 112, affinity determination module 114, and anomaly resolution module 116 include instructions that are executable on the processor 108.

A processor can include any or some combination of a microprocessor, a core of a multi-core microprocessor, a microcontroller, a programmable integrated circuit, a programmable gate array, or another hardware processing circuit. Machine-readable instructions executable on a processor can refer to the instructions executable on a single processor or the instructions executable on multiple processors.

The multi-planar graph building module 112 receives the event data 106 transmitted by an entity (or multiple entities) of the system 102. The multi-planar graph building module 112 builds a multi-planar graph 118 based on the event data. The event data include event objects, where each event objects includes multiple attributes, and each attribute can be assigned one of multiple possible different values. The multi-planar graph 118 includes nodes representing respective values of attributes of events represented by the event data 106. In addition, the multi-planar graph 118 includes edges between the nodes. Each respective edge represents co-occurrence of values of attributes represented by nodes connected to the respective edge. Co-occurrence of values of attributes refers to the values of attributes each occurring within an event object. For example, an attribute value V1 of attribute A1 (referred to as "A1.V1") co-occurs with an attribute value V1 of attribute A2 (referred to as "A2.V1") if both A1.V1 and A2.V1 occurs within an event object. If A1.V1 and A2.V1 occurs within multiple event objects, then A1.V1 and A2.V1 are considered to co-occur multiple times.

The multi-planar graph 118 includes multiple planes, where each plane contains nodes representing values of a respective individual attribute. More specifically, in some examples, each plane of the multi-planar graph 118 includes values of just one respective attribute.

The multi-planar graph 118 is provided to the affinity determination module 114, which computes edge weights of corresponding edges in the multi-planar graph 118 based on counts associated with the nodes and counts associated with the edges of the multi-planar graph 118. A count associated with a node (a "node count") that represents a given attribute value (i.e., a value of an attribute) is based on a number of occurrences of the given attribute value in the events represented by the event data 106. The node count associated with a node can be a simple count of the number of event objects in which the given attribute value is present. In other examples, a node count associated with the node can include a derived value that is computed based on the number of occurrences of the given attribute value in the event objects representing the events.

The counts associated with the edges ("edge counts") are based on a number of co-occurrences of respective pairs of values of attributes in the events. For example, if A1.v1 and A2.v1 co-occur in M (M≥1) event objects in the event data 106, then an edge count associated with the edge that connects a first node representing A1.v1 and a second node representing A2.v1 is based on M—the edge count can equal M or the edge count is a derived value computed based on M.

The affinity determination module 114 identifies paths in the multi-planar graph 118, where each path of the paths includes two or more nodes and a corresponding edge or edges that connect the two or more nodes. The affinity determination module 114 further applies a shortest path determining process that uses the edge weights for distances of the identified paths. A shortest path determining process can apply a shortest path algorithm, such as Dijkstra's algorithm, or a different algorithm. A shortest path algorithm attempts to find a path between nodes in a graph such that the sum of weights of the constituent edges is minimized. The shortest path determining process determines affinity between pairs of attribute values.

In examples where the event data 106 represents events corresponding to an anomaly that occurred at a resource 103 (or multiple resources 103) of the system 102, then the affinity derived based on the shortest path determining process can be used to determine relationships between events represented by the event data 106. The affinity between events can be used to determine a root cause of the anomaly.

Once the root cause of the anomaly is identified, then the anomaly resolution module 116 is able to provide an anomaly resolution indication 120 that can be used to address the anomaly in the system 102. A root cause of an anomaly can include any or some combination of the following: failure of a machine or a component in a machine, failure or error of a program, failure or error in communications over a link, data corruption, execution of a malware, incorrectly entered user credential, and so forth. Affinity between events represented by the event data 106 can be used by the anomaly resolution module 116 to identify a source of the anomaly, such as a device on which malware has been loaded.

The anomaly remediation indication 120 can provide an instruction to address the anomaly. For example, the anomaly remediation indication 120 can be provided to a remediation engine 122 of the system 102. In response to the anomaly remediation indication 120, the remediation engine 122 can perform shutdown of a device including the malware, stop communications of the device with a remainder of the system 102, reboot of the device, reconfiguring the device, and so forth.

To address other types of anomalies, the remediation engine 122 can perform other remediation actions in response to the anomaly remediation indication 120.

More generally, the anomaly remediation indication 120 can provide an instruction to cause an operation of the system 102 (or a portion of the system 102) to change to address an anomaly in the system 102 as indicated by the event data 106.

Figure 2:
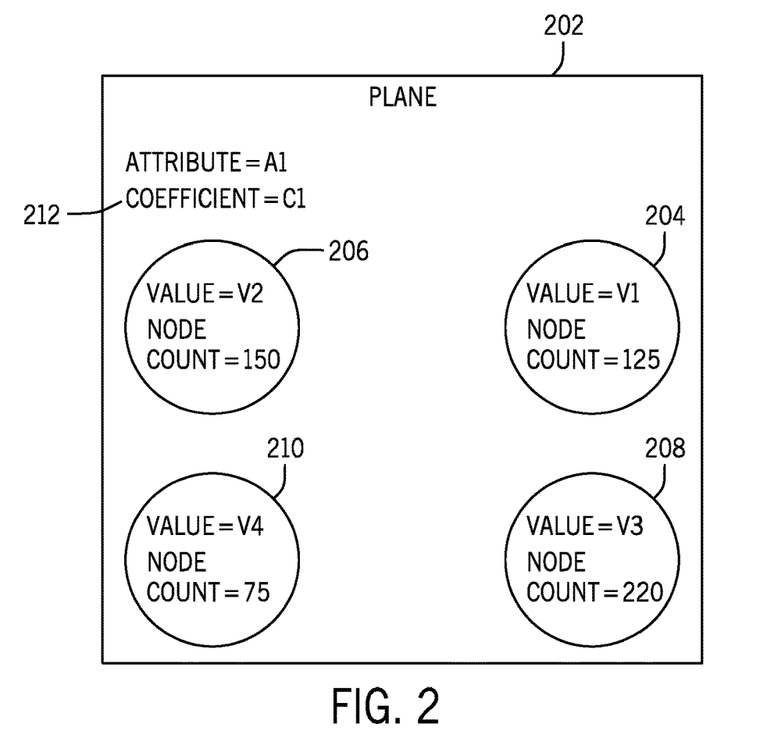
FIG. 2 illustrates a plane of a multi-plane graph that includes values associated with a respective attribute, according to some examples.

FIG. 2 is a block diagram of a plane 202 (which can be part of the multi-planar graph 118 of FIG. 1). The plane 202 corresponds to a respective individual attribute, which in the example of FIG. 2 is attribute A1. The plane 202 further includes nodes 204, 206, 208, and 210, which represent respective different values (V1, V2, V3, and V4 of the attribute A1). Each node 204, 206, 208, and 210 is also associated with a node count, which is a count that indicates a number of occurrences of the value of the attribute A1 represented by the node. For example, for the node 204, the node count is set equal to 125, which indicates that the value V1 of the attribute A1 occurred 125 times in event objects.

It is noted that the actual positions of the nodes 204, 206, 208, and 210 in the plane 202 is not important. The nodes representing the values of the attribute A1 do not intersect in the plane 202.

In some examples, the plane 202 can also be associated with a coefficient 212, which represents an importance of the attribute A1. In the example of FIG. 1, the coefficient 212 of the attribute A1 is set to the value C1. Different values of the coefficient 212 indicate different importance of the attribute A1. The coefficient is used to the computation of edge weights associated with edges, as discussed further below.

In other examples, the coefficient 212 can be omitted.

Figure 3:
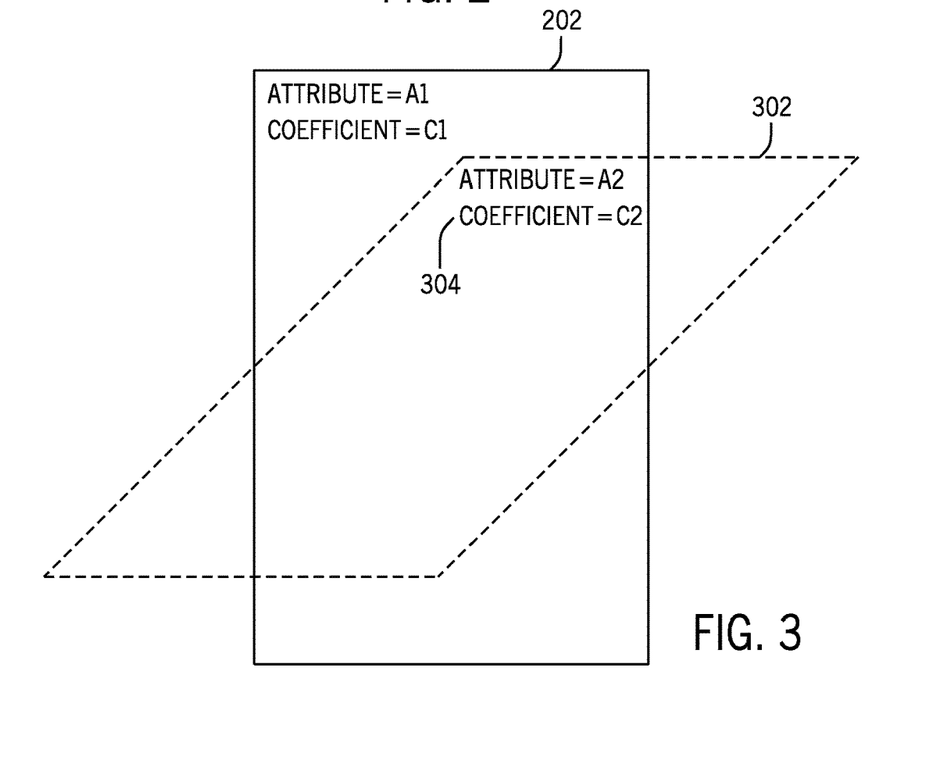
FIG. 3 shows multiple planes of a multi-plane graph, according to some examples.

FIG. 3 shows an example that depicts two planes 202 and 302 that can be part of the multi-planar graph 118. The plane 302 includes nodes representing values of another attribute A2. In some examples, the plane 302 can include a coefficient 304 that represents an importance of values of the attribute A2. In other examples, the coefficient 304 can be omitted.

For additional attributes, additional planes can be provided in the multi-planar graph 118, where each additional plane represents a respective additional individual attribute. The planes of the multi-planar graph 118 are arranged to intersect one another.

Figure 4:
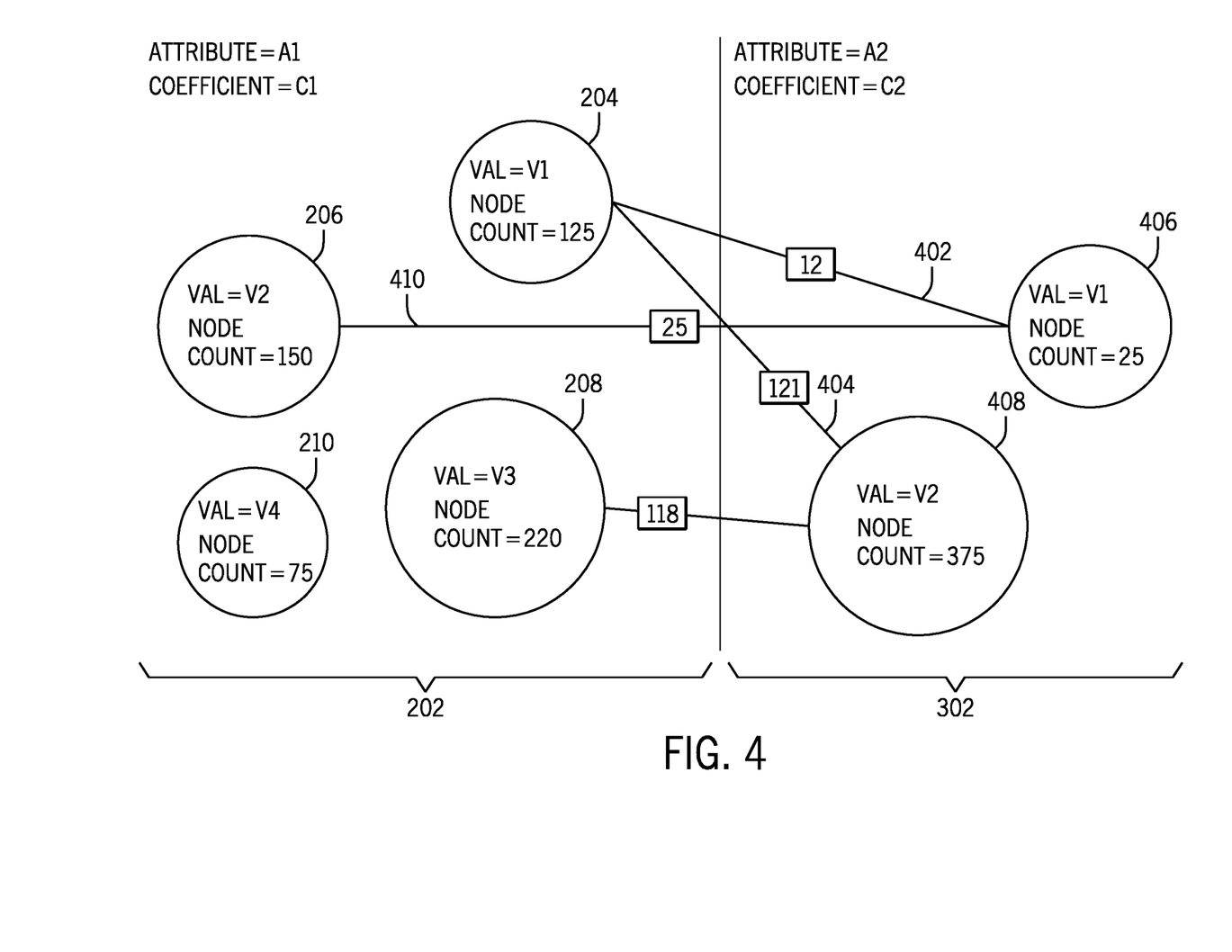
FIG. 4 illustrates a multi-plane graph with nodes and edges connecting the nodes, according to further examples.

FIG. 4 shows a different view of the multi-planar graph 118 that shows edges connecting respective nodes, to represent co-occurrences of corresponding pairs of attribute values. For example, in FIG. 4, the node 204 in the plane 202 is connected over edges 402 and 404 to respective nodes 406 and 408. The node 406 represents value V1 of attribute A2, and the node 408 represents value V2 of attribute A2. Other edges are also depicted in FIG. 4 that connect other pairs of nodes.

Each edge is associated with an edge count that represents a number of occurrences of respective pairs of attribute values. For example, the edge 402 is associated with an edge count of 12, to represent that value V1 of attribute A1 and value V1 of attribute A2 co-occurred 12 times in event objects.

The example of FIG. 4 shows other edge counts for other edges connecting nodes between the planes 202 and 302.

The node counts and edge counts can be used to compute respective edge weights assigned to corresponding edges. As discussed further below, the edge weights are used in deriving distances for paths in the graph 118, such that a shortest path determining process can determine affinities between respective pairs of attribute values.

In an example, an edge weight of an edge 410 between nodes 206 and 406 in FIG. 4 is computed as follows:

EDGE_WEIGHT=C1·NODE_A1.V2.COUNT+
C2·NODE_A2.V1.COUNT+EDGE.COUNT1.

In the foregoing, C1 and C2 represent coefficients indicating relative importance of the attributes A1 and A2, respectively. Also, NODE_A1.V2.COUNT represents the node count of the node 206, and NODE_A2.V1.COUNT represents the node count of the node 406. Also, EDGE. COUNT1 represents the edge count of the edge 410 between the nodes 206 and 406.

Similar computations of edge weights can be computed for other edges of the multi-planar graph 118. More generally, an edge weight is computed as follows:

EDGE_WEIGHT=COEFFICIENT1·NODE1.COUNT+
COEFFICIENT2·NODE2.COUNT+EDGE.
COUNT.

The above formula for computing edge weights effectively encode the node counts, edge counts, and importance coefficients. The edge weights are used for distances of paths in the multi-planar graph 118, for use in a shortest path algorithm.

For example, the inverse of EDGE_WEIGHT as computed above can be used to represent an affinity between nodes. Thus, the inverse of EDGE_WEIGHT (1/EDGE_WEIGHT) can be referred to as an "affinity value" that represents the affinity between nodes in different planes of the multi-planar graph 118.

The affinity value decreases with increased affinity between the nodes. The affinity values can be used to compute paths between nodes in the multi-planar graph 118. A path can include one edge, or alternatively, multiple edges, depending upon how many nodes the path traverses. A shortest path algorithm attempts to find a shortest path between two nodes, where "shortest" means the cumulative distance (as measured by the affinity value(s) assigned to respective edge(s) in the path) is smallest.

Figure 5A:
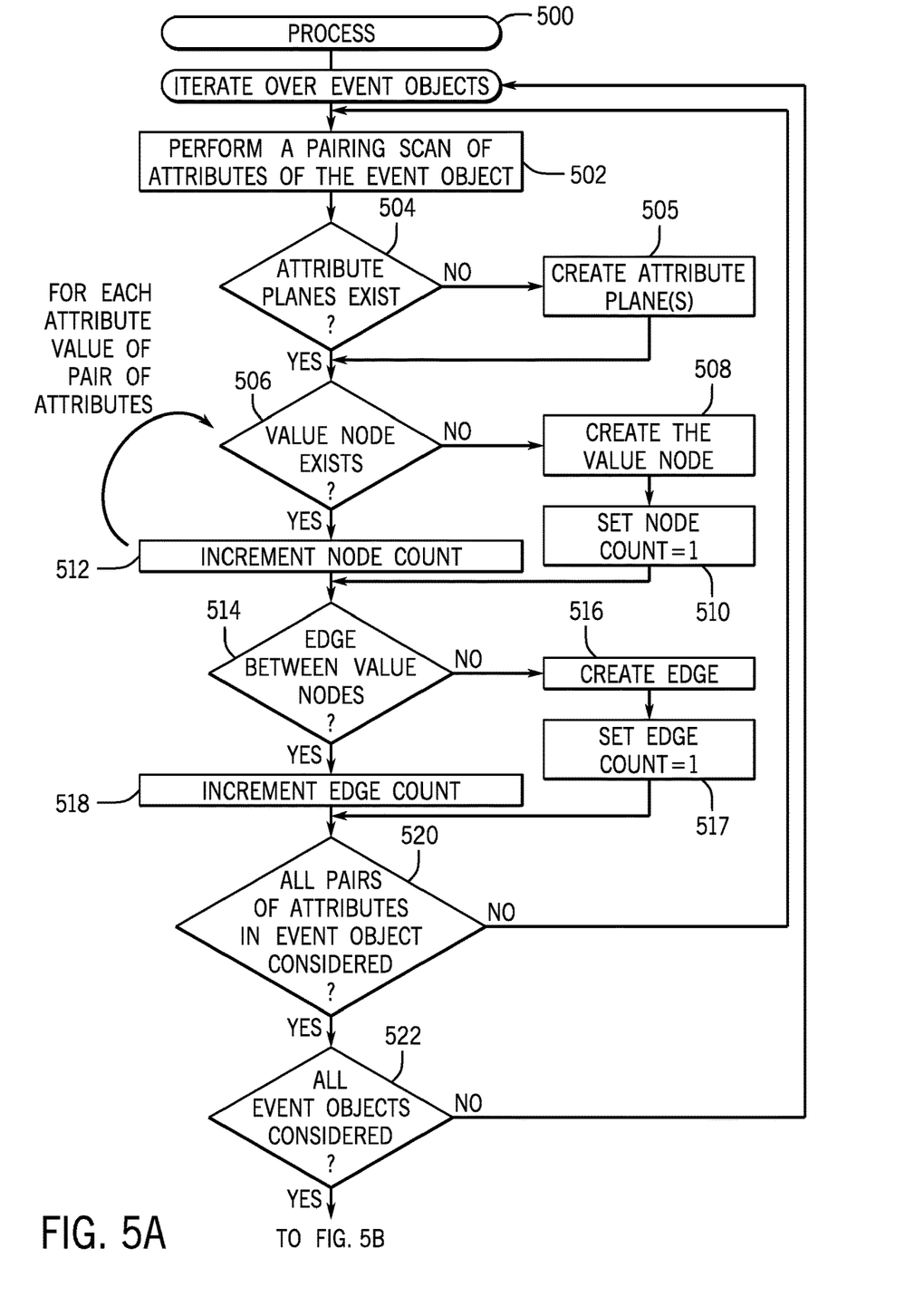
FIGS. 5A-5B depict a flow diagram of a process according to some examples.
Figure 5B:
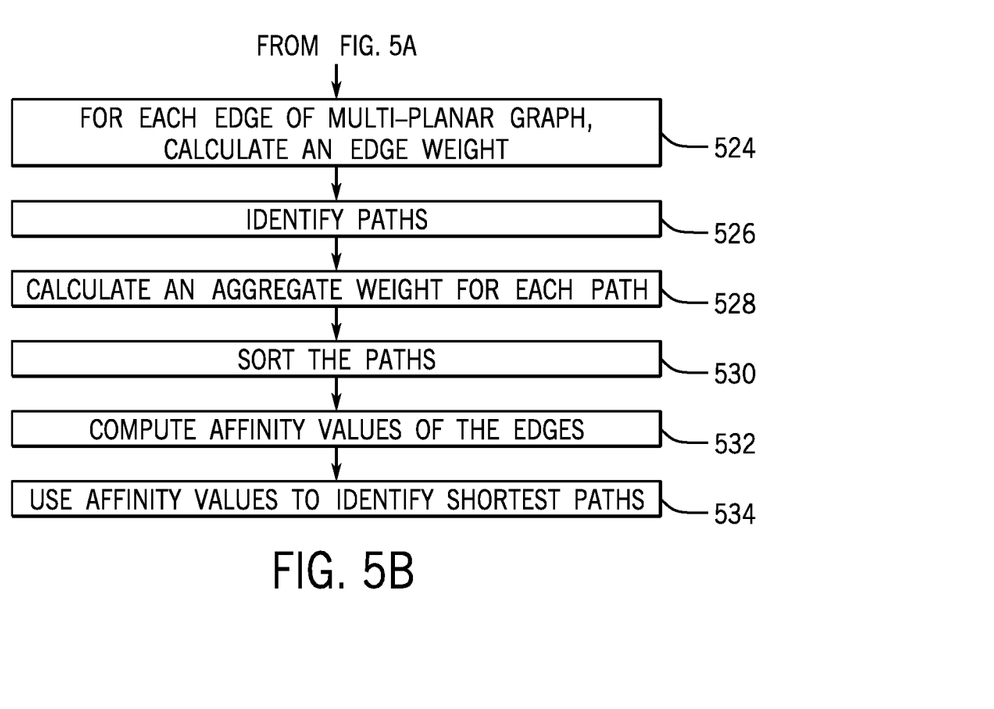

FIGS. 5A-5B show a flow diagram of a process 500 according to some examples. The process 500 includes iterating over event objects in the search domain, which includes the event data 106 (FIG. 1). For a currently considered event object, the process 500 includes performing (at 502) a pairing scan of the attributes of the event object.

For each pair of attributes in the event object, the process 500 considers the attributes and values. For both attributes in the pair, the process 500 determines (at 504) if respective attribute planes (e.g., 202 and 302 in FIGS. 2 and 3) exist. The attribute plane contains the space of actual existing values for the attribute. If the attribute plane does not exist for a given attribute, then the attribute plane can be created (at 505) for the given attribute. If both attribute planes do not exist for the pair of attributes, then task 505 creates both attribute planes.

Once the process 500 has determined that both attribute planes for the attributes of the considered pair of attributes exist (or has been created), the process 500 next considers the related values of the pair of attributes. For each attribute value, the process 500 determines (at 506) if a value node exists in the respective attribute plane for the given attribute value. If the value node does not exist, the process 500 creates (at 508) the value node in the attribute plane, and sets (at 510) the node count of the created value node to 1. If the value node does exist, the process 500 increments (at 512) the node count of the value node.

Once the process 500 has created or updated the respective value nodes for the values of the attributes of the considered pair of attributes, the process 500 determines (at 514) if an edge between the value nodes exists. If not, the process 500 creates (at 516) such an edge and sets (at 517) its edge count to 1. If the edge already exists, the process 500 increments (at 518) the edge count.

Tasks 502-518 are re-iterated for every pair of attributes and every event object. More specifically, the process 500 determines (at 520) if all pairs of attributes in the currently considered event object have been considered. If not, the process 500 returns to task 502 to consider the next pair of attributes in the currently considered event object.

If all pairs of attributes in the currently considered event object have been considered, the process 500 determines (at 522) if all event objects have been considered. If not, the process 500 returns to consider the next event object. If so, the graph building has completed and multi-planar graph 118 is updated.

Once the multi-planar graph 118 is updated, the process 500 performs a scan of the edges of the multi-planar graph

118. For each edge, the process 500 calculates (at 524) an edge weight using the formula for EDGE_WEIGHT discussed above.

Then, by picking a starting attribute value, a path can be identified (at 526) between any two nodes in the multi-planar graph 118, where the path is non-reentrant into the same plane (the same attribute may not appear more than once in the same path). A path being non-reentrant on a given plane refers to the path not crossing the given plane more than once. Task 526 identifies multiple paths in the multi-planar graph 118.

The process calculates (at 528) an aggregate weight (also referred to as "path weight") for each path. If a path includes multiple edges, then the aggregate weight is an aggregate (e.g., a sum or other type of mathematical aggregate such as average, mean, maximum, minimum, weighted average or sum, etc.) of the edge weights of the edges of the path.

The process 500 sorts (at 530) the paths by their aggregate weights, to produce a list of the most common attribute/value clusters. An aggregate weight for a path denotes the affinity of the corresponding pair of component attributes/values. By sorting the paths by the aggregate weights, an ordered list of the attribute/value pairs in order of affinity (e.g., highest affinity to lowest affinity) can be obtained.

The process 500 further computes (at 532) affinity values of the edges, such as by taking the inverse of the edge weights discussed above. The process 500 uses (at 534) the affinity values to identify shortest paths using a shortest path algorithm. The shortest paths determine which pairs of attribute values have greater affinity to one another. In using the shortest-path algorithm, a list of the "best" (e.g. highest) aggregate weights can be obtained.

Figure 6:
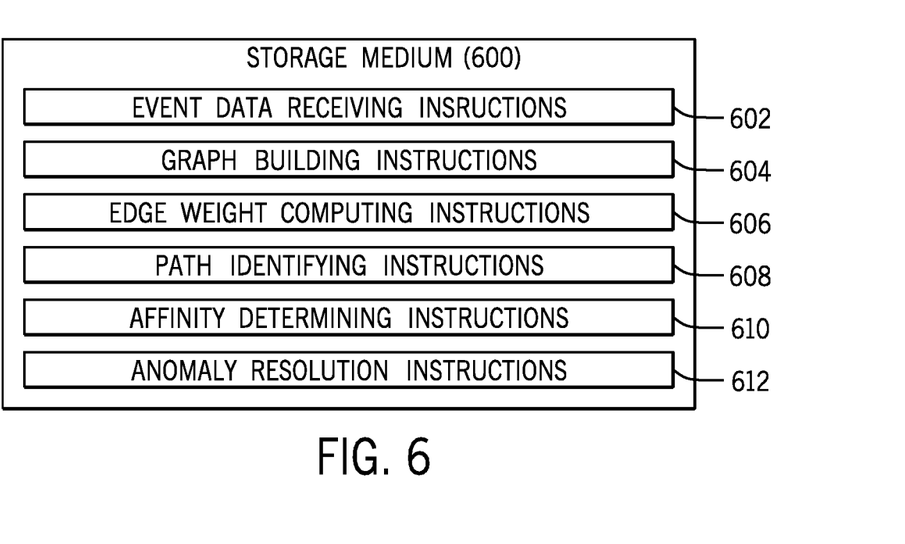
FIG. 6 is a block diagram of a storage medium storing machine-readable instructions according to some examples.

FIG. 6 is a block diagram of a non-transitory machine-readable or computer-readable storage medium 600 comprising machine-readable instructions that upon execution cause a computer to perform various tasks.

The machine-readable instructions include event data receiving instructions 602 to receive event data relating to events of a system. The machine-readable instructions include graph building instructions 604 to build a graph comprising nodes representing respective values of attributes of the events, and edges between the nodes, each respective edge of the edges representing co-occurrence of values of attributes represented by nodes connected by the respective edge.

The machine-readable instructions include edge weight computing instructions 606 to compute edge weights of corresponding edges of the edges, and path identifying instructions 608 to identify paths in the graph, where each path of the paths comprises two or more nodes and a corresponding edge or edges.

The machine-readable instructions include affinity determining instructions 610 to determine an affinity among the values of the attributes based on a shortest path determining process that uses the edge weights for distances of the identified paths. The machine-readable instructions further include anomaly resolution instructions 612 to resolve an anomaly in the system based on the determined affinity.

Figure 7:
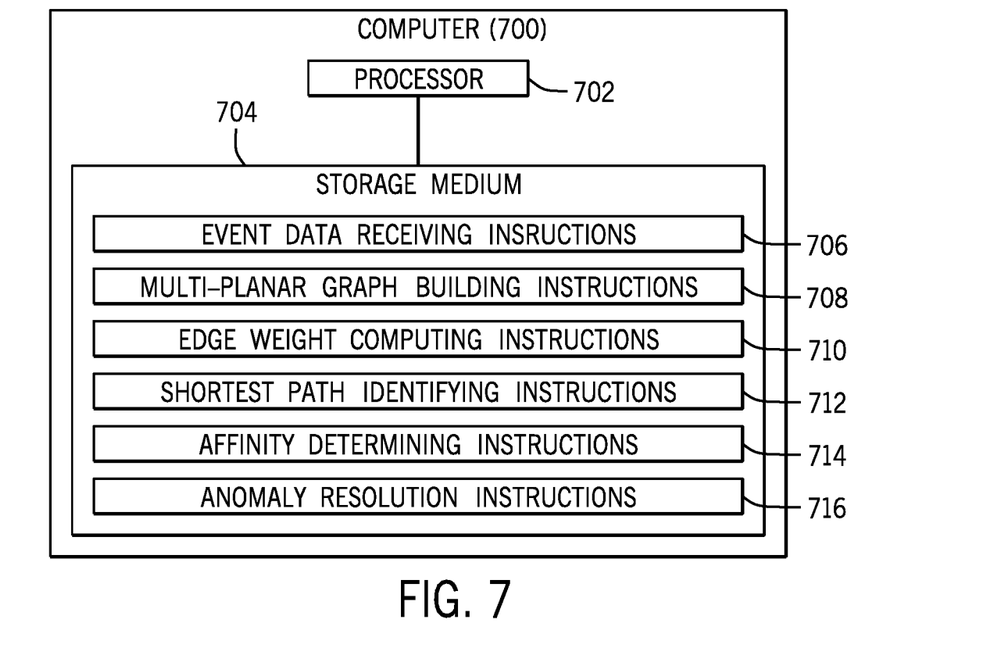
FIG. 7 is a block diagram of a computer according to some examples.

FIG. 7 is a block diagram of a computer 700 that includes a processor 702 and a non-transitory storage medium 704 storing machine-readable instructions executable on the processor 702 to perform various tasks. The machine-readable instructions include event data receiving instructions 706 to receive event data relating to events of a system. The machine-readable instructions include multi-planar graph building instructions 708 to build a multi-planar graph comprising nodes representing respective values of attributes of the events, and edges between the nodes, each respective edge of the edges representing co-occurrence of values of attributes represented by nodes connected by the respective edge, and each plane of a plurality of planes of the multi-planar graph comprising values of a respective attribute of the attributes.

The machine-readable instructions include edge weight computing instructions 710 to compute edge weights of corresponding edges of the edges based on counts associated with the nodes and counts associated with the edges, and path identifying instructions 712 to identify paths in the multi-planar graph, where each path of the paths comprises two or more nodes and a corresponding edge or edges.

The machine-readable instructions include shortest path determining instructions 714 to apply a shortest path determining process that uses the edge weights for distances of the identified paths, and anomaly resolution instructions 716 to resolve an anomaly in the system based on affinity among the values of the attributes determined using the shortest path determining process.

Figure 8:
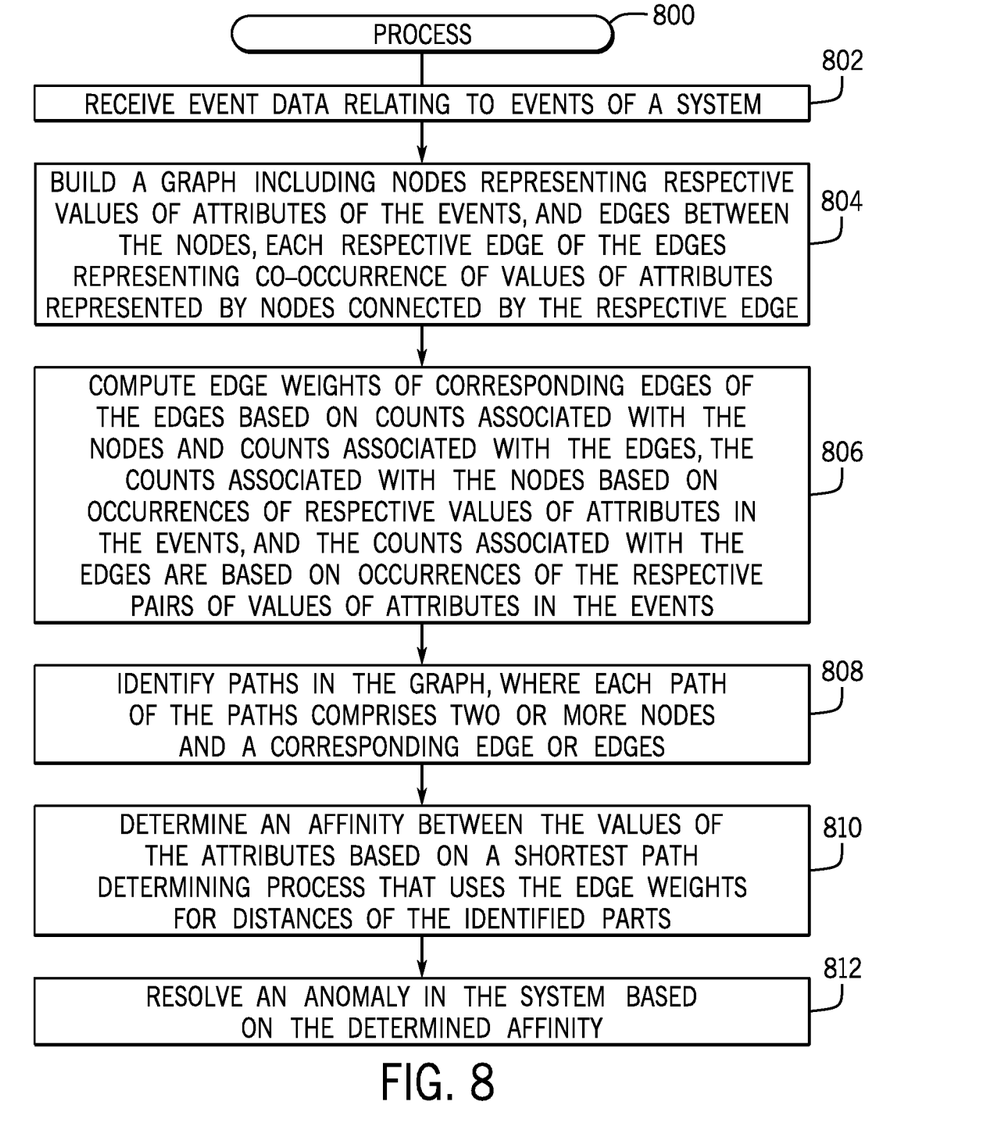
FIG. 8 is a flow diagram of a process according to further examples.

FIG. 8 is a flow diagram of a process 800 according to further examples. The process 800 includes receiving (at 802) event data relating to events of a system, and building (at 804) a graph including nodes representing respective values of attributes of the events, and edges between the nodes, each respective edge of the edges representing co-occurrence of values of attributes represented by nodes connected by the respective edge.

The process 800 includes computing (at 806) edge weights of corresponding edges of the edges based on counts associated with the nodes and counts associated with the edges, the counts associated with the nodes based on occurrences of respective values of attributes in the events, and the counts associated with the edges are based on occurrences of respective pairs of values of attributes in the events.

The process 800 includes identifying (at 808) paths in the graph, where each path of the paths comprises two or more nodes and a corresponding edge or edges. The process 800 includes determining (at 810) an affinity between the values of the attributes based on a shortest path determining process that uses the edge weights for distances of the identified paths. The process 800 further includes resolving (at 812) an anomaly in the system based on the determined affinity.

The storage medium 100 (FIG. 1) or 600 (FIG. 6) or 704 (FIG. 7) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site (e.g., a cloud) from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a computer to:
receive event data relating to events of a system;
build a multi-planar graph comprising nodes representing respective values of attributes of the events, and edges between the nodes, each respective edge of the edges representing co-occurrence of values of attributes represented by nodes connected by the respective edge, and each plane of a plurality of planes of the multi-planar graph comprising values of a respective attribute of the attributes;
compute edge weights of corresponding edges of the edges;
identify paths in the graph, wherein each path of the paths comprises two or more nodes and a corresponding edge or edges;
determine an affinity among the values of the attributes based on a shortest path determining process that uses the edge weights for distances of the identified paths; and
resolve an anomaly in the system based on the determined affinity.

2. The non-transitory machine-readable storage medium of claim 1, wherein the edge weights of corresponding edges of the edges are based on counts associated with the nodes and counts associated with the edges.

3. The non-transitory machine-readable storage medium of claim 2, wherein the edge weights are further based on coefficients that indicate importance of respective attributes.

4. The non-transitory machine-readable storage medium of claim 2, wherein the counts associated with the nodes are based on occurrences of respective values of attributes in the events.

5. The non-transitory machine-readable storage medium of claim 2, wherein the counts associated with the edges are based on occurrences of respective pairs of values of attributes in the events.

6. The non-transitory machine-readable storage medium of claim 1, wherein each respective path of the paths is non-reentrant on any plane of the plurality of planes.

7. The non-transitory machine-readable storage medium of claim 6, wherein a path being non-reentrant on any plane of the plurality of planes restricts an attribute from appearing more than once in the respective path.

8. The non-transitory machine-readable storage medium of claim 1, wherein the instructions upon execution cause the computer to:
for a respective path of the identified paths, compute a path weight that is based on an aggregate of the edge weights of edges that are part of the respective path, wherein the path weight is used to derive a distance of the shortest path determining process.

9. The non-transitory machine-readable storage medium of claim 8, wherein the aggregate of the edge weights of edges that are part of the respective path comprises a sum of the edge weights of edges that are part of the respective path.

10. The non-transitory machine-readable storage medium of claim 8, wherein the path weight represents an affinity between values of attributes connected by the respective path.

11. A computer comprising:
a processor; and
a non-transitory storage medium storing instructions executable on the processor to:
receive event data relating to events of a system;
build a multi-planar graph comprising nodes representing respective values of attributes of the events, and edges between the nodes, each respective edge of the edges representing co-occurrence of values of attributes represented by nodes connected by the respective edge, and each plane of a plurality of planes of the multi-planar graph comprising values of a respective attribute of the attributes;
compute edge weights of corresponding edges of the edges based on counts associated with the nodes and counts associated with the edges;
identify paths in the multi-planar graph, wherein each path of the paths comprises two or more nodes and a corresponding edge or edges;
apply a shortest path determining process that uses the edge weights for distances of the identified paths; and
resolve an anomaly in the system based on affinity among the values of the attributes determined using the shortest path determining process.

12. The computer of claim 11, wherein each respective path of the paths is non-reentrant on any plane of the plurality of planes.

13. The computer of claim 12, wherein a path being non-reentrant on any plane of the plurality of planes restricts an attribute from appearing more than once in the respective path.

14. The computer of claim 11, wherein the instructions are executable on the processor to:
for a respective path of the identified paths, compute a path weight that is based on an aggregate of the edge weights of edges that are part of the respective path, wherein the path weight is used to derive a distance of the shortest path determining process.

15. The computer of claim 14, wherein the path weight represents an affinity between values of attributes connected by the respective path.

16. The computer of claim 11, wherein the counts associated with the nodes are based on occurrences of respective values of attributes in the events, and the counts associated with the edges are based on occurrences of respective pairs of values of attributes in the events.

17. The computer of claim 11, wherein the shortest path determining process uses a shortest path algorithm.

18. A method performed by a computer, comprising:
receiving event data relating to events of a system;
building a multi-planar graph comprising nodes representing respective values of attributes of the events, and edges between the nodes, each respective edge of the edges representing co-occurrence of values of attributes represented by nodes connected by the respective edge, and each plane of a plurality of planes of the multi-planar graph comprising values of a respective attribute of the attributes;
computing edge weights of corresponding edges of the edges based on counts associated with the nodes and counts associated with the edges, the counts associated with the nodes based on occurrences of respective values of attributes in the events, and the counts associated with the edges are based on occurrences of respective pairs of values of attributes in the events;

identifying paths in the graph, wherein each path of the paths comprises two or more nodes and a corresponding edge or edges;

determining an affinity between the values of the attributes based on a shortest path determining process that uses the edge weights for distances of the identified paths; and resolving an anomaly in the system based on the determined affinity.

19. The method of claim 18, wherein each respective path of the paths is non-reentrant on any plane of the plurality of planes.

20. The method of claim 18, further comprising:

for a respective path of the identified paths, compute a path weight that is based on an aggregate of the edge weights of edges that are part of the respective path, wherein the path weight is used to derive a distance of the shortest path determining process.

* * * * *